United States Patent [19]

Jaeckering

[11] 4,007,289

[45] Feb. 8, 1977

[54] PROTEIN-RICH BAKING PRODUCT AND METHOD FOR ITS MANUFACTURE

[76] Inventor: Guenter Jaeckering, Soennern near Werl, Germany

[22] Filed: Apr. 28, 1975

[21] Appl. No.: 572,210

Related U.S. Application Data

[63] Continuation of Ser. No. 410,252, Oct. 26, 1973, abandoned.

[52] U.S. Cl. .................................. 426/549; 426/19
[51] Int. Cl.² ........................................ A21D 13/06
[58] Field of Search ............................. 426/549, 19

[56] References Cited

UNITED STATES PATENTS

| | | | |
|---|---|---|---|
| 2,797,212 | 6/1957 | Miley et al. | 426/343 X |
| 3,091,538 | 5/1963 | Zacharia | 426/343 X |
| 3,154,419 | 10/1964 | Thompson et al. | 426/343 |
| 3,185,574 | 5/1965 | Gabby et al. | 426/343 X |
| 3,679,433 | 7/1972 | Pomeranz et al. | 426/152 X |

*Primary Examiner*—Raymond N. Jones
*Attorney, Agent, or Firm*—Ernest F. Marmorek

[57] ABSTRACT

An extended shelf-like baking product which is rich in proteins, can be firmly cut and does not form crumbs, is produced from a mixture of more than 30% and up to 70%, preferably 60% to 70% by weight of vital wheat proteins with an equilibrium moisture of 8% to 13% together with an amount of 100% cereal starch necessary to make up 100%.

2 Claims, 1 Drawing Figure

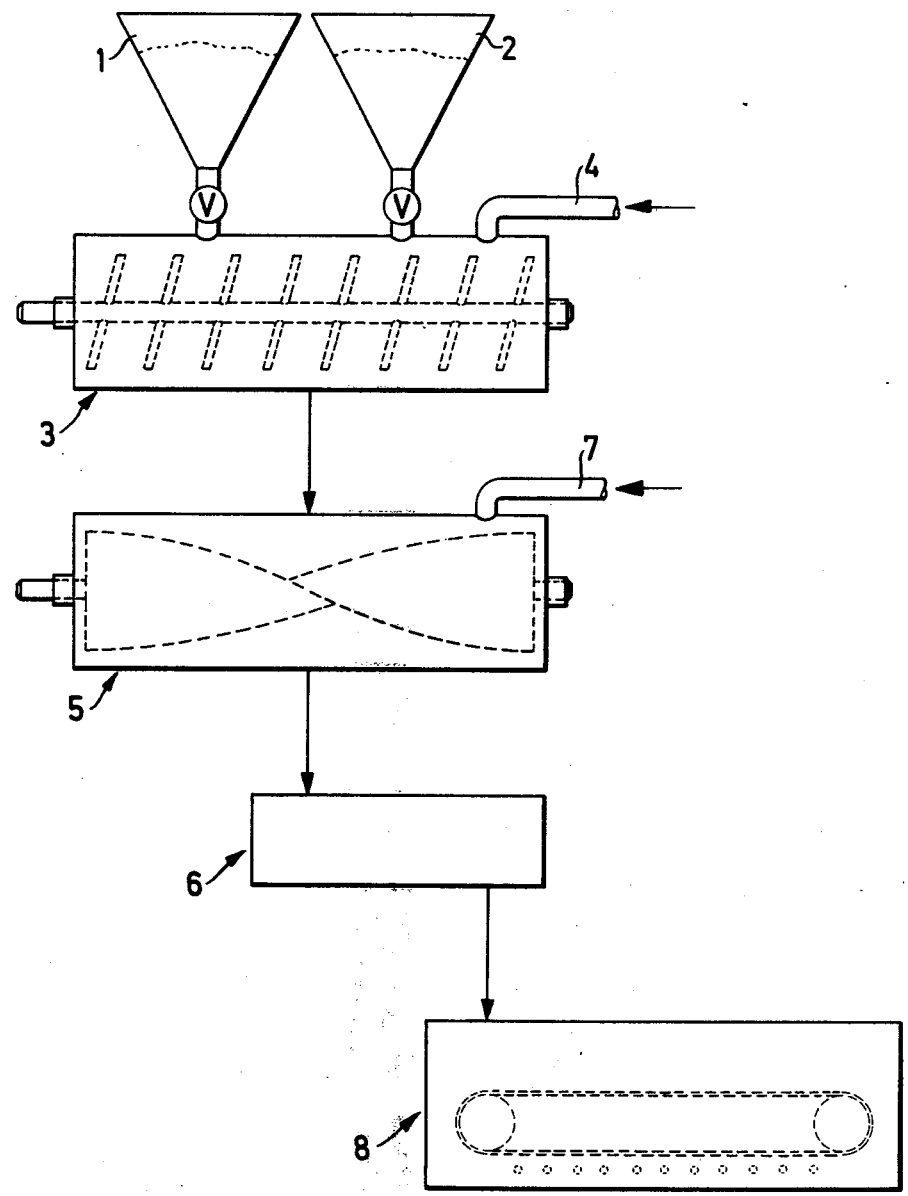

PROTEIN-RICH BAKING PRODUCT AND METHOD FOR ITS MANUFACTURE

This is a continuation of application Ser. No. 410,252, filed Oct. 26, 1973, now abandoned.

The invention relates to an extended shelf-life baking product which is rich in proteins, can be firmly cut and does not produce crumbs.

The invention is concerned with baking products of the type which have become more and more important for reaction-free nutrition and have also gained increasing importance for persons required a special diet.

For decades efforts have been made to produce high-protein baked products, largely directed toward the health-foods market. In particular, bread products of this nature have been produced which contain up to 25% protein (wheat protein was most often preferred by the consumer) and which have the disadvantage of having only a limited shelf-life. It is known that bread products which remain unsold after several days must be taken back by the bakeries. Since local weather and storage conditions affect a wide variance in the shelf-life of these products many added problems in cost control result.

However, a much greater protein content is desirable for physiological nutrition. Prior baking processes did not permit this since baked goods produced by these processes even at requiring above-mentioned protein content of 25% have a greatly reduced culting firmness and large crumb formation. This has a detrimental effect upon a possible consumer.

An object of the present invention is to provide a permanent baking product which is rich in proteins, can be firmly cut and does not produce crumbs, as well as a process for making such baking product, whereby the term "proteins" is to always signify a vital protein which must not be denaturalized and wherein the finished baking product contains a much larger percentage of protein than was possible heretofore.

Other objects of the present invention will become apparent in the course of the following specification.

In the accomplishment of the objectives of the present invention it was found desirable to start with a mixture containing more than 30% and up to 70%, preferably 60% to 70% by weight of vital wheat proteins with an equilibrium moisture content of 8% to 13% and together with enough cereal starch to make up 100%. In accordance with the process of the present invention to a dry mixture are added water in an amount less than the water absorbing capacity of the mixture, preferably between 60 to 70 parts, with a small amount of skim milk (defattened milk) and salt according to taste. The mixture thus produced is kneaded until it appears homogeneous and until a farinograph (according to Brabander) shows a viscosity of 600 to 650. Next, the mixture is allowed to stand from about 30 to 90 min. at a temperature of 30° to 15° C to develop its inner structure.

The resulting dough, free from chemical leavening agents, is cut into pieces and baked in an oven at a temperature starting at 210° C and falling to 190° C so as to develop a crust which will allow only a limited amount of steam to pass through it.

The term "chemical leavening agents" is used herein to indicate agents which do not consist of a natural product, such as yeast, for example.

The baking industry has clearly recognized the importance of high-protein baked goods that have an extra-long shelf-life. For years it has tried to produce such products, but has always failed to achieve this goal. Now, however, the present invention makes possible a process which can be used on a mass producton basis to provide baked goods which will retain the quality for months at a time without any deterioration in taste, and which can be cleanly sliced without producing crumbs.

The mixture contains isolated component parts of protein which are generally referred to as gluten. A mixture of 60% hard wheat and 40% soft wheat was found to be particularly effective as the initial substance.

Yeast can be added to the mixture, but in a smaller percentage than usual. It does not act as a leavening agent but serves to avoid crumbs, to improve pore structure, to provide vitamins and to have an emulsifying action.

The following example of the process of the present invention it stated by way of exemplification only.

The process of the present invention may contain the following steps:

1. Producing a dry mixture of 65% vital wheat protein produced from 60% hard wheat and 40% soft wheat with an equilibrium moisture content of 8% to 13% together with cereal starch in such amounts as are needed C. A make 100%, if necessary, 1% natural yeast.

2. Inner kneading with 66 parts water containing 12% skim milk (defattened milk). (The work is carried out using less than the maximum amount of water that can be absorbed by the mixture.

3. A rest period of 30 min. at 30° C. to allow the dough to develop its inner structure. (In another successful run the pause was 90 min. at 15° C.

4. Cutting dough parts. Other dough separation methods provide difficulties due to the sticky consistency of the intermediate product and its viscosity.

5. Baking, whereby the expansion of dough in the oven takes place not so much as a result of the leavening agent (if any has been added) but as the result of steam formation. The danger that the temperature will produce a crust which is too thick is avoided if temperature requirements are maintained starting at 210° C and decreasing to 190° C. A skin which is too thick would prevent passage for steam, would deform the baking product and cause undesirable hollow spaces in the interior of the piece. On the other hand the directions provided by the present invention result in a correct skin thickness having a pore volume with permissible steam passage. The correct skin thickness is also important for packing, proper biting and cutting.

The duration of baking depends upon the size of cut pieces. For a piece of bread having a weight of 4.8 gr. the above requirements produce a baking time period of 12 min. which should be exactly maintained.

6. Cooling period at room temperature.

A device for carrying out the method of making a baking product of the present invention is illustrated by way of example only in the attached drawing of sole FIGURE of which shows diagrammatically various parts of the device.

The drawing shows two storage hoppers 1 and 2 containing wheat protein and grain starch. A mixer 3 mixes these component parts possibly with the addition of natural yeast. This addition is indicated symbolically by the numeral 4 in the drawing. The kneading under addition of water and skim milk takes place in the kneader device 5 which transmits the kneaded mass into the dough dividing apparatus 6.

The additions of water and skim milk are indicated symbolically by the numeral 7 in the drawing.

Pieces of dough cut in the dough dividing apparatus 6 are baked in the oven 8.

The final analysis of the finished product shows 61% protein.

Grain starch can be replaced totally or partially by flour without producing baking difficulties typical for as high in protein baking products as are within the scope of the instant invention. However, the dietic value of the baking product is higher when no flour is used.

The present invention makes possible the manufacture of a high protein baking product of a new type with predetermined and standardized properties.

I claim:

1. A process for making a protein-rich baked product having an extended shelf-life and which can be cleanly sliced consisting essentially of the steps of:

adding approximately 60 to 70 parts by weight vital wheat protein having a moisture content of approximately 8–13% and a quantity of cereal starch having a moisture content of approximately 10 to 15% sufficient to make 100 parts by weight to not more than 70 parts by weight of water whereby there is less water than that which the mixture has the capacity to absorb; then kneading the mixture of vital wheat protein, cereal starch, and water until it reaches a consistency which will register from approximately 600 to 650 units on a Brabender farinograph;

allowing the kneaded mixture to stand for approximately 30 to 90 minutes at a temperature of from 30° to 15° C to develop the inner structure of the dough; subsequently cutting the dough into pieces as required by the product to be prepared; and thereafter baking the dough pieces at a temperature which is initially at approximately 210° C and which decreases to 190° C for a period of time sufficient to form a crust;

the steam formed during baking effecting expansion of the baked product, free from requiring chemical leavening agents.

2. A high protein baked product produced by the process of claim 1.

* * * * *